(12) United States Patent
Kitahara

(10) Patent No.: US 7,258,002 B2
(45) Date of Patent: Aug. 21, 2007

(54) FLUID FLOW DETECTING APPARATUS

(75) Inventor: Noboru Kitahara, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 11/603,899

(22) Filed: Nov. 24, 2006

(65) Prior Publication Data

US 2007/0125167 A1 Jun. 7, 2007

(30) Foreign Application Priority Data

Dec. 2, 2005 (JP) .............................. 2005-349262

(51) Int. Cl.
 *G01F 1/68* (2006.01)
(52) U.S. Cl. .................................... 73/202.5
(58) Field of Classification Search ............... 73/202.5, 73/204.21, 204.22, 204.19
See application file for complete search history.

(56) References Cited

U.S. PATENT DOCUMENTS

| 5,546,794 | A | 8/1996 | Kuhn et al. |
| 5,804,718 | A | 9/1998 | Nagasaka et al. |
| 6,018,994 | A | 2/2000 | Yonezawa et al. |
| 6,938,473 | B2 * | 9/2005 | Iwaki et al. .............. 73/204.21 |

FOREIGN PATENT DOCUMENTS

| JP | 07-198440 | 8/1995 |
| JP | 09-287985 | 11/1997 |
| JP | 10-300545 | 11/1998 |

* cited by examiner

*Primary Examiner*—Jewel Thompson
(74) *Attorney, Agent, or Firm*—Nixon & Vanderhye P.C.

(57) ABSTRACT

A fluid flow detecting apparatus is disclosed for detecting a characteristic of fluid flowing in a fluid passage. The fluid flow detecting apparatus includes a sensor body that defines a bypass passage for flow of a portion the fluid flowing in the fluid passage. The apparatus also includes a sensor provided in the bypass passage for detecting the characteristic of the fluid flowing in the bypass passage and a plurality of plates. The sensor body is provided between the plurality of plates. Each of the plates has a width dimension oriented approximately along the direction of flow of fluid flowing in the fluid passage. The width of the plates is greater than a corresponding width dimension of the sensor body such that the sensor body is inside a region defined between the plates.

15 Claims, 5 Drawing Sheets

FLUID FLOW DETECTING APPARATUS

CROSS REFERENCE TO RELATED APPLICATION

The following is based on and claims priority to Japanese Patent Application No. 2005-349262, filed Dec. 2, 2005, which is hereby incorporated by reference in its entirety.

FIELD OF THE INVENTION

The following relates to a fluid flow detecting apparatus and, more specifically relates to a fluid flow detecting apparatus with a sensor provided inside a region defined between plates.

BACKGROUND OF THE INVENTION

Various types of fluid flow meters have been proposed for detecting and measuring characteristics relating to fluid and/or fluid flow. For instance, thermal type air flow meters have been proposed that measure air flow rate utilizing a resistance temperature characteristic of a hot wire. These thermal type air flow meters have been proposed for measuring a flow rate of air taken into an internal combustion engine.

The thermal type air flow meter described in Japanese Patent No. 9-287985A, for example, has a sensor body which is inserted in an air intake pipe of an internal combustion engine. A bypass passage is formed inside the sensor body through which part of the air flowing through the intake pipe passes. The air flow meter measures a flow rate of the air flowing through the intake pipe (i.e. an intake air flow rate) based on the amount of heat radiated from a heater element installed in the bypass passage. Such a prior-art thermal type air flow meter can make stable measurement with little variation when measuring a steady air flow.

However, prior art fluid flow detecting devices suffer from certain disadvantages. For instance, in prior art thermal-type air flow meters, measurement accuracy decreases when measuring a pulsating flow, which results from intake pulsation of an internal combustion engine, and which reduces the velocity of the air flowing through the bypass passage.

More specifically, as shown in FIG. 5, in a steady air flow air flow separation occurs on both sides of a sensor body 100, so that the velocity of the air exiting the bypass passage does not decrease substantially. In other words, the loss caused when the air flow exiting the bypass passage joins the main flow is relatively small, so that the velocity of the air flowing through the bypass passage is not reduced substantially. This enables stable air flow measurement.

However, as shown in FIG. 5, in a pulsating flow the air flow separation occurring on both sides of the sensor body 100 is relatively small so that the main flow velocity near the exit of the bypass passage remains relatively high. This causes the air flow exiting the bypass passage to suffer a large loss when joining the main flow. As a result, the velocity of the air flowing through the bypass passage decreases substantially. This condition can cause measurement errors. Therefore, there remains a need for a more accurate fluid flow detecting apparatus.

SUMMARY

A fluid flow detecting apparatus is disclosed for detecting a characteristic of fluid flowing in a fluid passage. The fluid flow detecting apparatus includes a sensor body that defines a bypass passage for flow of a portion the fluid flowing in the fluid passage. The apparatus also includes a sensor provided in the bypass passage for detecting the characteristic of the fluid flowing in the bypass passage and a plurality of plates. The sensor body is provided between the plurality of plates. Each of the plates has a width dimension oriented approximately along the direction of flow of fluid flowing in the fluid passage. The width of the plates is greater than a corresponding width dimension of the sensor body such that the sensor body is inside a region defined between the plates.

DETAILED DESCRIPTION OF THE EMBODIMENTS

Figure 1A:
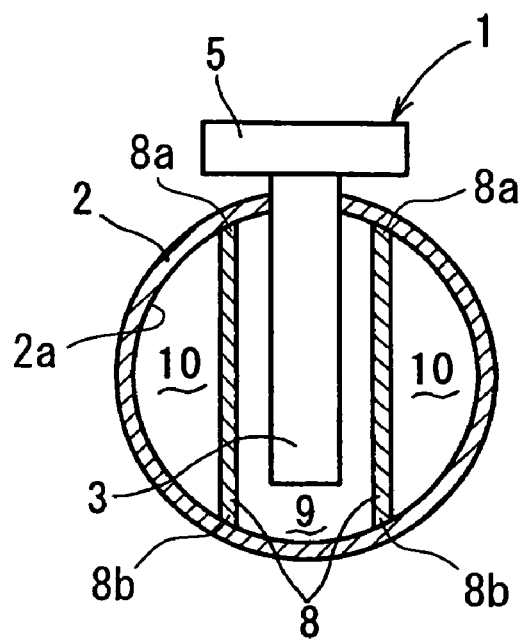
FIG. 1A is an end, sectional view of one embodiment of a fluid flow detecting apparatus.
Figure 1B:
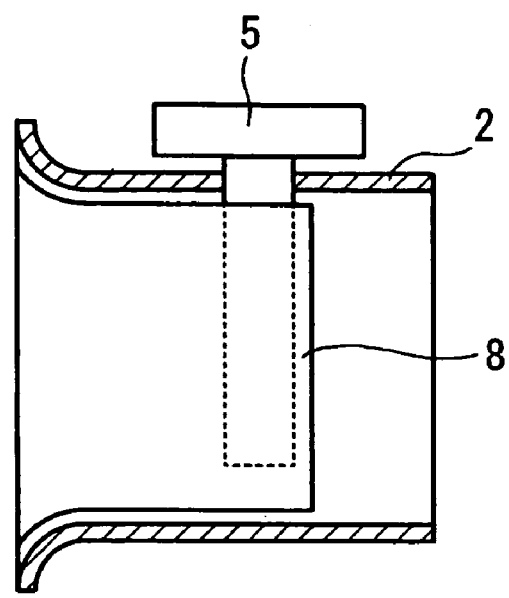
FIG. 1B is a side, sectional view of the fluid flow detecting apparatus of FIG. 1A.
Figure 1C:
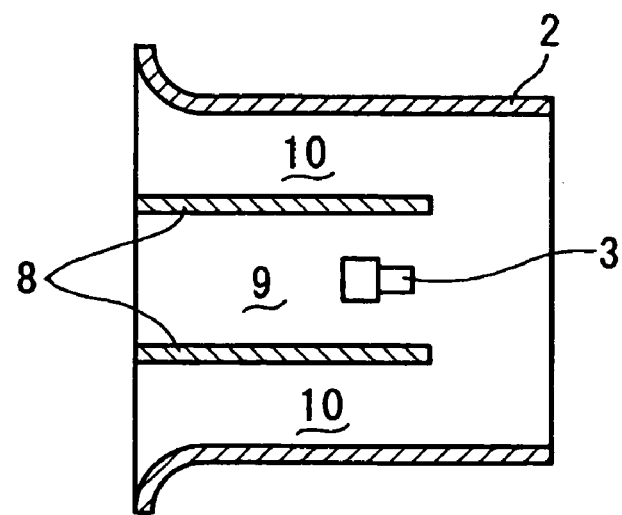
FIG. 1C is a top, sectional view of the fluid flow detecting apparatus of FIG. 1A.
Figure 2:
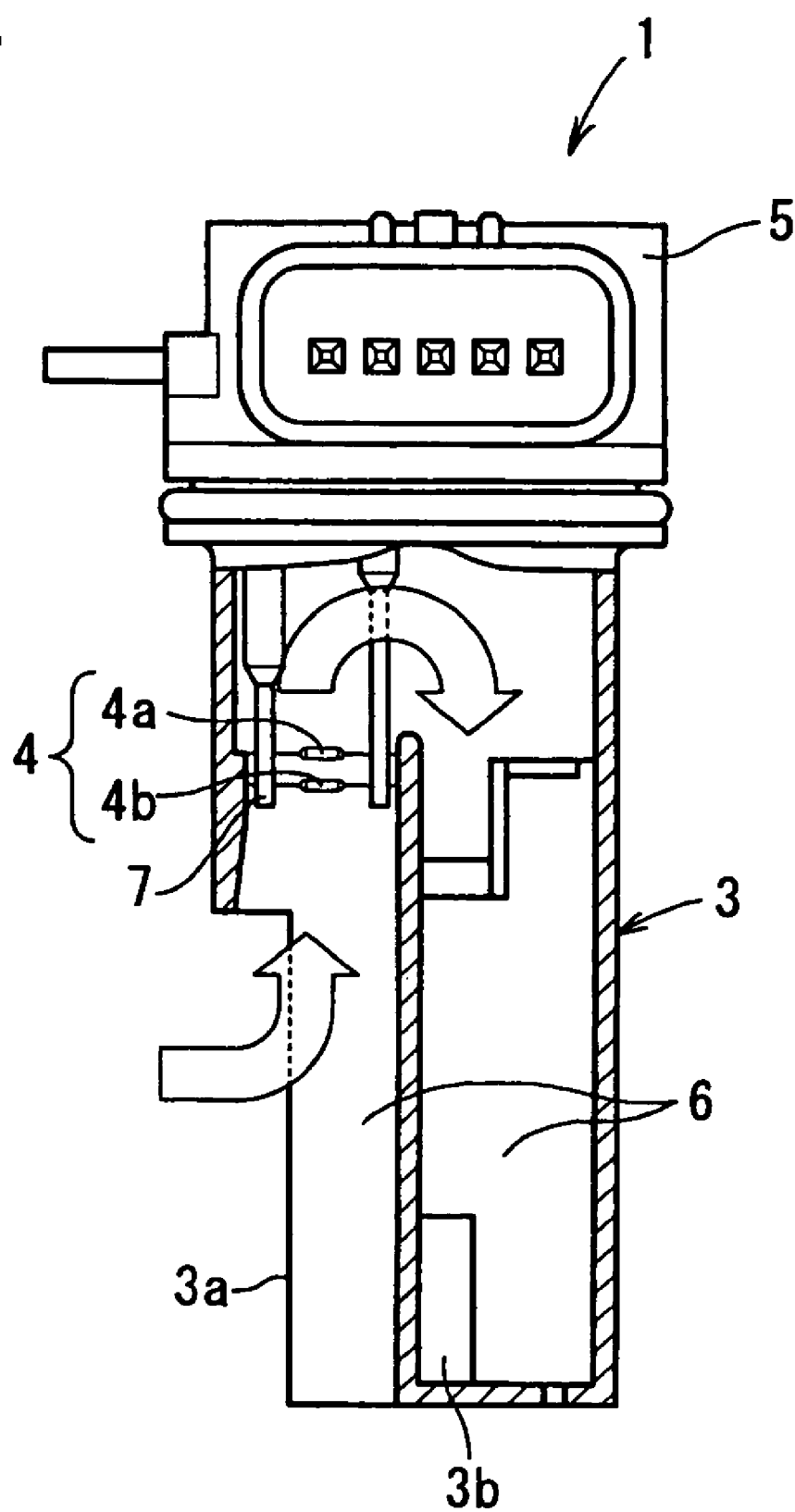
FIG. 2 is a side, sectional view of a sensor body for the fluid flow detecting apparatus of FIG. 1A.

Referring now to FIGS. 1A to 2, one embodiment of a fluid flow detecting apparatus 1 is shown. The fluid flow measuring apparatus 1 (i.e., fluid flow detecting apparatus 1) is provided in a fluid passage 2 for detecting a characteristic of fluid flowing in the fluid passage 2. In one embodiment, the fluid flow detecting apparatus is an air flow measuring apparatus 1 for measuring an air flow taken into a vehicle engine. More specifically, the fluid passage is an outlet passage 2 of an air cleaner in communication with an internal combustion engine. Also, the air flow measuring apparatus 1 detects flow rate of air sucked into the internal combustion engine through the intake passage. In another embodiment, the air flow measuring apparatus 1 is provided in a throttle body. However, it will be appreciated that the fluid flow detecting apparatus 1 can be used in any suitable fluid passage 2 for detecting any fluid characteristic of any fluid flowing therein.

Furthermore, a mounting hole is provided in the outlet passage 2. The air flow measuring apparatus 1 is inserted through the mounting hole for plug-in installation in the outlet passage 2. Thus, the air flow measuring apparatus 1 is detachably installed by the plug-in method in the outlet pipe 2.

The air flow measuring apparatus 1 includes, as shown in FIG. 2, a sensor body 3, a sensing section 4 (i.e., a sensor), and a circuit module 5.

The sensor body 3 is, as shown in FIGS. 1A to 1C, provided in the outlet pipe 2. Inside the outlet pipe 2, the sensor body 3 is disposed substantially orthogonal to the axis of the outlet pipe 2 (i.e., the vertical direction as seen in FIGS. 1A and 1B). A bypass passage 6 is defined inside the sensor body 3 as shown in FIG. 2. A portion of the air flow (hereinafter referred to as the "main flow") in the outlet pipe 2 is directed through the bypass passage 6.

In the embodiment shown, the bypass passage 6 is formed to direct the air flowing in through an inlet 3a to leave the bypass passage 6 though an outlet 3b after changing its flow direction by 180 degrees (i.e. after making a U-turn). In the following description, the air flowing through the bypass passage 6 will be referred to as the "bypass flow." The bypass flow is indicated by arrows in FIG. 2.

The sensing section 4 includes a heater element 4a and a thermosensor 4b which are disposed upstream of the U-turn portion of the bypass passage 6. The heater element 4a and the thermosensor 4b are connected, each via a corresponding terminal 7, to an internal circuit board (not shown) of the circuit module 5.

The circuit module 5 is provided at an upper end portion of the sensor body 3 and is outside the mounting hole provided in the outlet pipe 2 (see FIGS. 1A-1C). The circuit module 5 controls the amount of electric current applied to the heater element 4a so as to maintain a substantially constant detected temperature difference between the heater element 4a and the thermosensor 4b.

Furthermore, the air flow measuring apparatus 1 includes a plurality of plates 8. The sensor body 3 is provided between the plates 8. The plates 8 and the sensor 3 are provided in spaced relationship to each other (see FIGS. 1A and 1C) such that part of the main flow pass between each of them. The plates 8 have a width dimension oriented approximately along the direction of fluid flow. In the embodiment shown, the width dimension of the plates 8 is substantially parallel to the axis of the outlet pipe 2.

Furthermore, as shown in FIG. 1A, each of the plates 8 includes a first edge 8a and a second end 8b that abut against an interior surface 2a of the outlet pipe 2. In the embodiment shown, the first edge 8a is on an opposite end from the second end 8b. As such, the plates 8 divide the fluid passage of the outlet pipe 2 into an inner passage 9 and a plurality of outer passages 10. The sensor body 3 is provided within the inner passage 9.

The width of the plates 8 is greater than the corresponding width of the sensor body 3 such that the entire sensor body 3 in the width dimension is disposed inside a region defined between the plates 8. More concretely, as shown in FIG. 1C, the upstream end (left end as seen in the figure) of each of the current plates 8 is positioned upstream of the upstream end of the sensor body 3, and the downstream end of each of the current plates 8 is positioned downstream of the downstream end of the sensor body 3. The upstream end of each of the current plates 8, in particular, protrudes substantially beyond the upstream end of the sensor body 3. In the embodiment shown, the upstream end reaches the inlet of the outlet pipe 2.

Next, the operation of the air flow measuring apparatus 1 will be described. When the engine starts and an air flow (i.e., main flow) is generated in the outlet pipe 2, part of the main flow in the inner passage 9 enters the bypass passage 6 of the sensor body 3. In the sensing section 4 disposed in the bypass passage 6, when the velocity of the bypass flow increases, the heat radiation of the heater element 4a increases, so that the electric current applied to the heater element 4a increases so as to keep the difference between the temperature of the heater element 4a and the air temperature detected by the thermosensor 4b constant. Inversely, when the velocity of the bypass flow decreases, the heat radiation of the heater element 4a decreases, so that the electric current applied to the heater element 4a decreases. An electrical signal (e.g., a voltage signal) dependent on the amount of electric current applied to the heater element 4a is output from the circuit module 5 to an external ECU (i.e., electric control unit), thereby enabling the ECU to determine the air flow rate.

Figure 3:
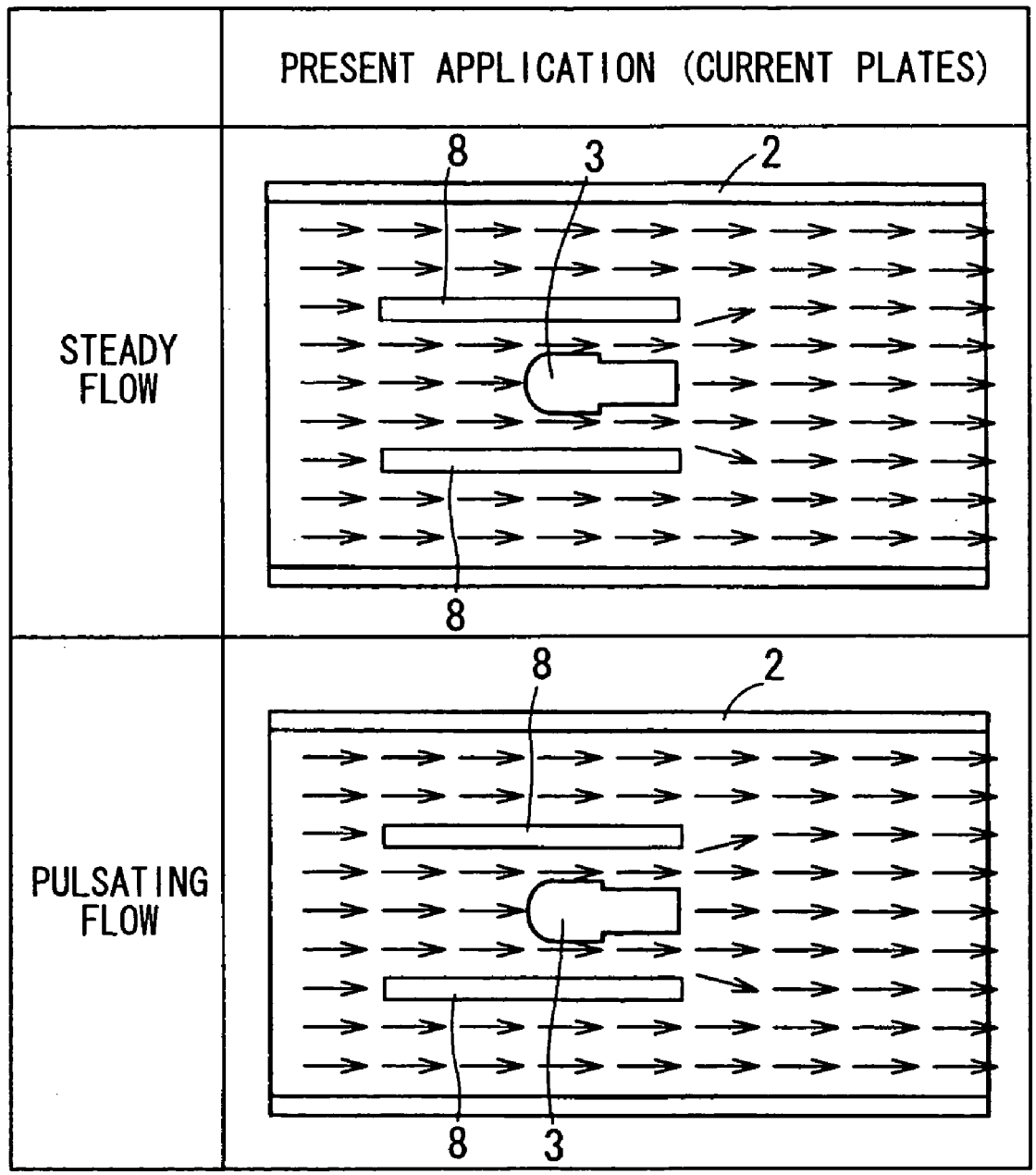
FIG. 3 is a schematic view of the fluid flow detecting apparatus of FIG. 1A shown during operation in a steady flow and in a pulsating flow.

In the present embodiment, the sensor body 3 is provided between the plates 8. Also, the current plates 8 are positioned substantially along the direction of the main flow. Thus, the main flow in the inner passage 9 flowing outside the sensor body 3 remains approximately the same regardless of whether flow is steady or pulsating. Namely, when the main flow is steady, the plates 8 suppress air flow separation from the sensor body 3 as shown in FIG. 3. Also, as shown in FIG. 3, when the main flow pulsates, the plates 8 limit the effect of the main flow in the outer passages 10 on the main flow in the inner passage 9 and outside the sensor body 3. Hence, the main flow portion flowing outside the sensor body 3 is substantially similar in steady and pulsating flow. As a result, measurement errors attributable to air flow pulsation can be reduced.

Figure 4A:
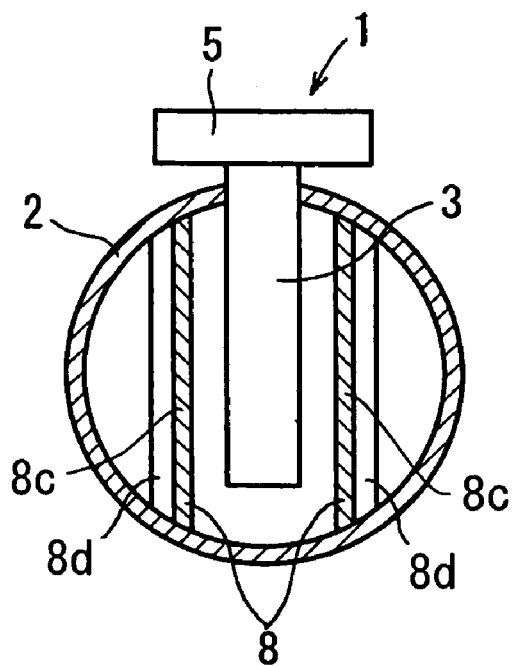
FIG. 4A is an end, sectional view of another embodiment of the fluid flow detecting apparatus.
Figure 4B:
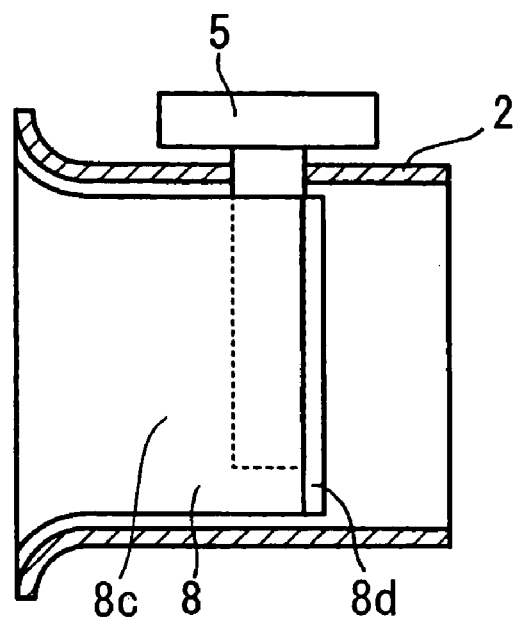
FIG. 4B is a side, sectional view of the fluid flow detecting apparatus of FIG. 4A.
Figure 4C:
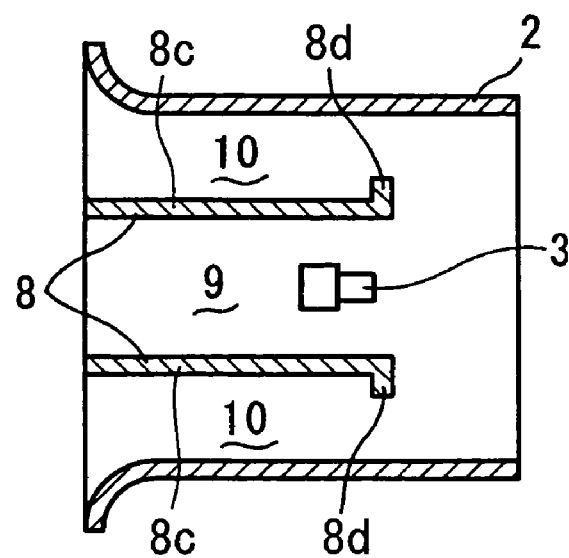
FIG. 4C is a top, sectional view of the fluid flow detecting apparatus of FIG. 4A.
Figure 5:
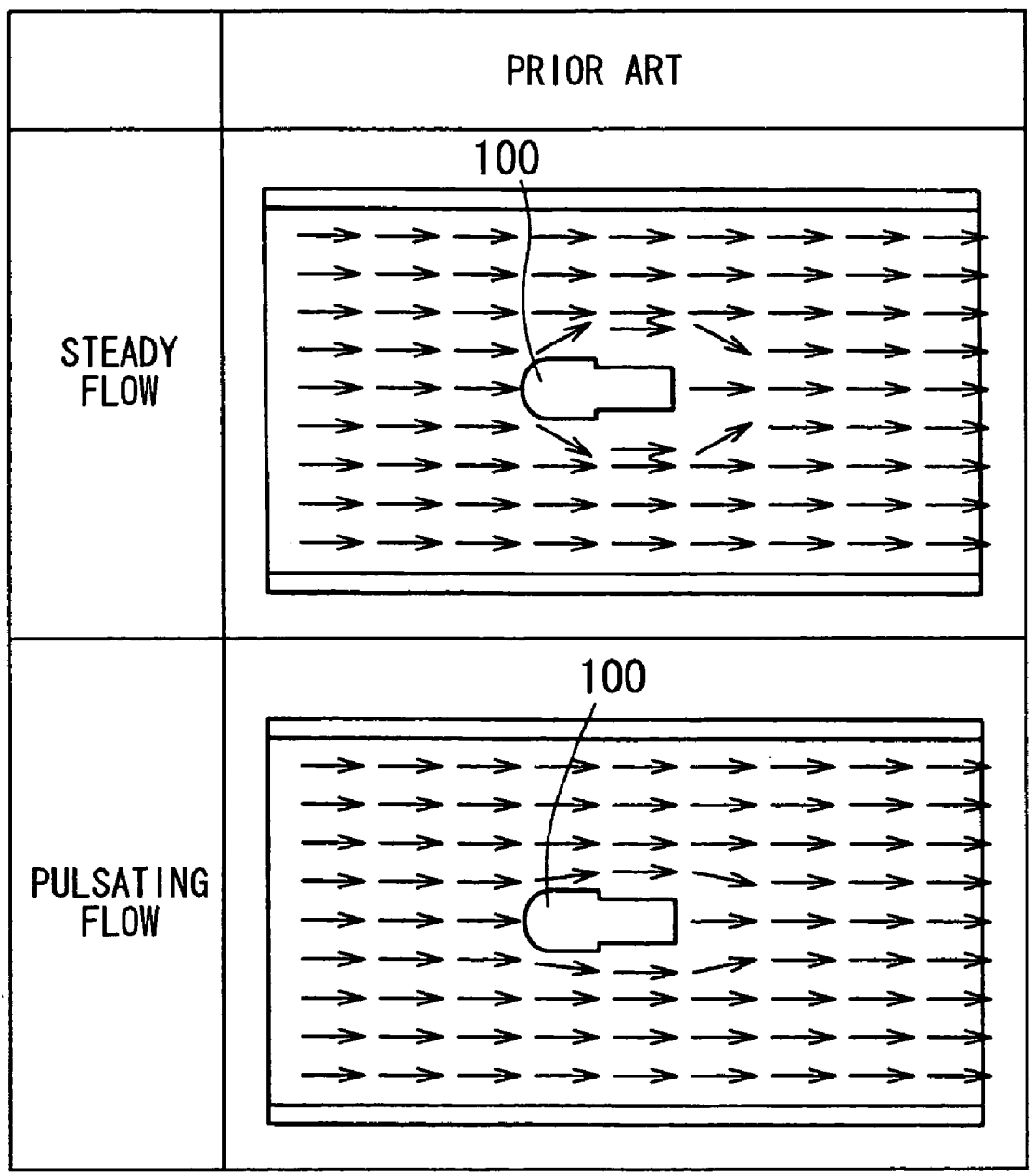
FIG. 5 is a schematic view of a fluid flow detecting apparatus of the prior art shown during operation in a steady flow and in a pulsating flow.

Referring now to FIGS. 4A-4C, another embodiment of the air flow measuring apparatus 1 is shown. In this embodiment, the plates 8 each include a main body portion 8c and a projection 8d that projects away from the respective main body portion 8c and into the respective outer passage 10. The projections 8d are provided downstream of the sensor body 3. However, it will be appreciated that the projections 8d can be provided in a location other than at a downstream end of the plates 8. Also, the projections 8d project substantially orthogonally away from the respective main body portion 8c. However, it will be appreciated that the projections 8d can extend away from the respective main body portion 8c at any suitable angle. The projections 8d produce air flow resistance in the respective outer passage 10 to thereby increase air flow loss in the respective outer passage 10. This enables air flow measurement with higher accuracy when the main flow pulsates and as the amount of air flowing through the inner passage 9 increases.

Although, in the second embodiment, the plates 8 are provided with the projections 8d to increase the air flow loss in the outer passages 10, means for producing resistance against air flow to increase the air flow loss in the outer passages 10 may be provided at other than the current plates 8. Instead of the projections 8d provided on the plates 8, equivalent means for producing resistance against air flow may be provided, for example, on the inner surface 2a of the outlet pipe 2.

Furthermore, even though the air flow measuring apparatus 1 is installed inside the outlet pipe 2 of an air cleaner, the location where the air flow measuring apparatus 1 is installed is not limited as such. The air flow measuring apparatus 1 may, for example, be attached to a throttle body.

The present invention has been described in an illustrative manner. It is to be understood that the terminology, which has been used, is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A fluid flow detecting apparatus for detecting a characteristic of fluid flowing in a fluid passage, the fluid flow detecting apparatus comprising:
   a sensor body that defines a bypass passage for flow of a portion the fluid flowing in the fluid passage;
   a sensor provided in the bypass passage for detecting a characteristic of the fluid flowing in the bypass passage; and
   a plurality of plates;
   wherein the sensor body is provided between the plurality of plates,
   wherein each of the plurality of plates has a width dimension oriented approximately along the direction of flow of fluid flowing in the fluid passage,
   wherein the width of each of the plurality of plates is greater than a corresponding width dimension of the sensor body such that the sensor body is inside a region defined between the plates;
   wherein the plurality of plates define a plurality of outer passages and an inner passage in the fluid passage,
   wherein the sensor body is provided in the inner passage, and
   further comprising a means for producing air flow resistance, wherein the means are provided downstream of the sensor body, and wherein the means increase an air flow loss in the respective outer passage.

2. The fluid flow detecting apparatus according to claim 1:
   wherein the fluid passage is an intake passage in communication with an intake port of an internal combustion engine, and
   wherein the sensor detects flow rate of air sucked into the internal combustion engine through the intake passage.

3. The fluid flow detecting apparatus according to claim 2,
   wherein a mounting hole is provided in one of an outlet pipe of an air cleaner forming a part of the intake passage and a wall of a throttle body, the mounting hole for inserting the sensor body in the intake passage and for plug-in installation.

4. The fluid flow detecting apparatus according to claim 1, wherein the plates each include a first edge and a second edge for abutment with an interior surface of the fluid passage.

5. A fluid flow detecting apparatus for detecting a characteristic of fluid flowing in a fluid passage, the fluid flow detecting apparatus comprising:
   a sensor body that defines a bypass passage for flow of a portion the fluid flowing in the fluid passage;
   a sensor provided in the bypass passage for detecting a characteristic of the fluid flowing in the bypass passage; and
   a plurality of plates;
   wherein the sensor body is provided between the plurality of plates,
   wherein each of the plurality of plates has a width dimension oriented approximately along the direction of flow of fluid flowing in the fluid passage,
   wherein the width of each of the plurality of plates is greater than a corresponding width dimension of the sensor body such that the sensor body is inside a region defined between the plates;
   wherein the plurality of plates defines a plurality of outer passages and an inner passage in the fluid passage, wherein the sensor body is provided in the inner passage;
   wherein the plurality of plates each further comprise a main body portion and a projection that projects away from the respective main body portion into the respective outer passage;
   wherein the projections are provided downstream of the sensor body; and
   wherein the projections increase an air flow loss in the respective outer passage.

6. The fluid flow detecting apparatus according to claim 5, wherein each projection is provided at a downstream end of the respective plate.

7. The fluid flow detecting apparatus according to claim 5:
   wherein the fluid passage is an intake passage in communication with an intake port of an internal combustion engine, and
   wherein the sensor detects flow rate of air sucked into the internal combustion engine through the intake passage.

8. The fluid flow detecting apparatus according to claim 7:
   wherein a mounting hole is provided in one of an outlet pipe of an air cleaner forming a part of the intake passage and a wall of a throttle body, the mounting hole for inserting the sensor body in the intake passage and for plug-in installation.

9. The fluid flow detecting apparatus according to claim 5 wherein the plates each include a first edge and a second edge for abutment with an interior surface of the fluid passage.

10. A method for detecting a characteristic of fluid flowing in a fluid passage, the fluid flow detecting method comprising:
    detecting a characteristic of fluid flowing in a bypass passage for a portion of fluid flowing in a fluid passage;
    using a sensor in said detecting step wherein the sensor is provided between a plurality of plates, each of the plurality of plates having a width dimension oriented approximately along the direction of flow of fluid flowing in the fluid passage, and the width of each of the plurality of plates being greater than a corresponding width dimension of the sensor body such that the sensor body is inside a region defined between the plates, the plurality of plates defining a plurality of outer passages and an inner passage in the fluid passage and the sensor body being provided in the inner passage; and
    producing air flow resistance downstream of the sensor body and increasing an air flow loss in the respective outer passage.

11. A method as in claim 10:
    wherein the fluid passage is an intake passage in communication with an intake port of an internal combustion engine, and
    wherein the sensor detects flow rate of air sucked into the internal combustion engine through the intake passage.

12. A method as in claim 11:
    wherein a mounting hole is provided in one of an outlet pipe of an air cleaner forming a part of the intake passage and a wall of a throttle body, the mounting hole for inserting the sensor body in the intake passage and for plug-in installation.

13. A method as in claim 10 wherein the plates each include a first edge and a second edge for abutment with an interior surface of the fluid passage.

14. A method for detecting a characteristic of fluid flowing in a fluid passage, the method comprising:
    detecting a characteristic of fluid flowing in a bypass passage for a portion of fluid flowing in a fluid passage;

using a sensor in said detecting step wherein the sensor body is provided between a plurality of plates, each of the plurality of plates having a width dimension oriented approximately along the direction of flow of fluid flowing in the fluid passage, and the width of each of the plurality of plates being greater than a corresponding width dimension of the sensor body such that the sensor body is inside a region defined between the plates, the plurality of plates defining a plurality of outer passages and an inner passage in the fluid passage, the sensor body being provided in the inner passage, and the plurality of plates each further comprising a main body portion and a projection that projects away from the respective main body portion into the respective outer passage, the projections being provided downstream of the sensor body; and using the projections to increase an air flow loss in the respective outer passage.

15. A method as in claim 14, wherein each projection is provided at a downstream end of the respective plate.

* * * * *

UNITED STATES PATENT AND TRADEMARK OFFICE
CERTIFICATE OF CORRECTION

| | | |
|---|---|---|
| PATENT NO. | : 7,258,002 B2 | Page 1 of 1 |
| APPLICATION NO. | : 11/603899 | |
| DATED | : August 21, 2007 | |
| INVENTOR(S) | : Kitahara | |

It is certified that error appears in the above-identified patent and that said Letters Patent is hereby corrected as shown below:

Please add the following claims to the application as follows:

Col. 8 line 10-22,

16. A method as in claim 14:

wherein the fluid passage is an intake passage in communication with an intake port of an internal combustion engine, and wherein the sensor detects flow rate of air sucked into the internal combustion engine through the intake passage.

17. A method as in claim 16:

wherein a mounting hole is provided in one of an outlet pipe of an air cleaner forming a part of the intake passage and a wall of a throttle body, the mounting hole for inserting the sensor body in the intake passage and for plug-in installation.

18. A method as in claim 14:

wherein the plates each include a first edge and a second edge for abutment with an interior surface of the fluid passage.

Signed and Sealed this

Fourteenth Day of October, 2008

JON W. DUDAS
*Director of the United States Patent and Trademark Office*